United States Patent
Wang

(10) Patent No.: US 7,887,250 B1
(45) Date of Patent: Feb. 15, 2011

(54) ALUMINUM WINDOW STRUCTURE

(76) Inventor: Ching-Hai Wang, 10F-6, No. 81, Suei Li Road, Hsinchu (TW)

(*) Notice: Subject to any disclaimer, the term of this patent is extended or adjusted under 35 U.S.C. 154(b) by 0 days.

(21) Appl. No.: 12/905,106

(22) Filed: Oct. 15, 2010

Related U.S. Application Data

(63) Continuation-in-part of application No. 12/155,693, filed on Jun. 9, 2008, now abandoned.

(51) Int. Cl.
*E04B 2/00* (2006.01)
(52) U.S. Cl. .................. 403/381; 403/331; 403/363; 52/586.2
(58) Field of Classification Search .......... 403/252, 403/253, 331, 363, 381; 52/586.2
See application file for complete search history.

(56) References Cited

U.S. PATENT DOCUMENTS

| | | | | |
|---|---|---|---|---|
| 3,160,249 A | * | 12/1964 | Pavlecka | 52/586.2 |
| 3,312,025 A | * | 4/1967 | Deakins | 52/239 |
| 3,640,039 A | * | 2/1972 | McKee et al. | 52/281 |
| 3,648,393 A | * | 3/1972 | Parrilla | 40/730 |
| 3,771,277 A | * | 11/1973 | Rausch et al. | 52/468 |
| 4,052,832 A | * | 10/1977 | Jungers et al. | 52/779 |
| 4,344,475 A | * | 8/1982 | Frey | 160/135 |
| 4,356,672 A | * | 11/1982 | Beckman et al. | 52/36.6 |
| 4,449,337 A | * | 5/1984 | Gzym et al. | 52/126.4 |
| 4,594,829 A | * | 6/1986 | Herrgord | 52/282.3 |
| 4,652,170 A | * | 3/1987 | Lew | 403/381 |
| 4,676,038 A | * | 6/1987 | Doyon et al. | 52/282.2 |
| 4,967,531 A | * | 11/1990 | Giles et al. | 52/587.1 |
| 5,033,526 A | * | 7/1991 | DeLong et al. | 160/135 |
| 5,207,037 A | * | 5/1993 | Giles et al. | 52/126.6 |
| 5,247,773 A | * | 9/1993 | Weir | 52/592.3 |
| 5,325,649 A | * | 7/1994 | Kajiwara | 52/586.1 |
| 5,537,795 A | * | 7/1996 | Dias | 52/586.2 |
| 5,592,794 A | * | 1/1997 | Tundaun | 52/220.7 |
| 6,189,280 B1 | * | 2/2001 | Malmberg | 52/506.05 |
| 6,761,004 B2 | * | 7/2004 | Anglin et al. | 52/238.1 |
| 6,952,905 B2 | * | 10/2005 | Nickel et al. | 52/711 |
| 7,418,805 B2 | * | 9/2008 | Tan | 52/582.2 |
| 7,481,406 B2 | * | 1/2009 | Lang et al. | 248/220.31 |
| 7,665,264 B1 | * | 2/2010 | Wolfe | 52/586.2 |
| 2004/0244317 A1 | * | 12/2004 | Tan | 52/204.1 |

* cited by examiner

*Primary Examiner*—Joshua T Kennedy
(74) *Attorney, Agent, or Firm*—Leong C. Lei

(57) ABSTRACT

A joint structure for aluminum windows which includes a first vertical frame having a first side provided with two joint members, and a sliding guide arranged at a center of the first side and between the first joint members, a second vertical frame having a first side provided with two second joint members, and a sliding guide arranged at a center of the first side and between the two second joint members, and a joint plate having two sides each provided with two joint members and a sliding rail between the two joint members, the joint members of the joint plate being adapted to engage with the joint members of the vertical frames, the sliding rail being adapted to engage with the sliding guide, the joint plate having two ends each provided with an accommodating groove, and a leak proof rubber fitted in the accommodating groove.

4 Claims, 7 Drawing Sheets

ALUMINUM WINDOW STRUCTURE

CROSS-REFERENCE TO RELATED APPLICATION

This is a continuation-in-part of the patent application Ser. No. 12/155,693 filed Jun. 9, 2008, now abandoned.

BACKGROUND OF THE INVENTION

FIG. 1 illustrates an assembly of two conventional aluminum windows. FIG. 2 illustrates an assembly of four conventional aluminum windows. As shown, it mainly joints the glass frames 20 with the window frames 10 inwardly. While in practical application, this kind of aluminum windows often are set by adopting the forms of side by side or top-down-left-right similar as the glass window curtain. And, the ordinary joint assembling method is to further form a joint bar plate 13 on the vertical frame plate 110 and horizontal frame plate 12 of the window frame 10. While the window frames 10 are left-right side by side assembled, an out laid vertical joint frame plate 30 is formed by jointing the joint bars 13 on the vertical frame plates 110 of these two window frames 10 as a whole. While the window frames 10 adopt the top-down joint assembling, a horizontal joint frame plate 40 is used by jointing the joint bars 13 on the horizontal vertical frame plates 12 of these two window frames 10 together as a whole. Such set up not only requires the extra joint bar 13, but have also the larger volume in the said vertical and horizontal joint frame plates 30, 40. Relatively, the used aluminum material becomes more thus increases the cost. At the same time, because the out laid joint method in the said vertical and horizontal joint plates 30, 40 is adopted, a complex sense of disorder has been created in the whole outside appearance of frames after assembling. This kind of assembling design is thus not an ideal one.

Therefore, it is an object of the present invention to provide an improvement in the aluminum window structure which can obviate and mitigate the above-mentioned drawbacks.

SUMMARY OF THE INVENTION

It is the primary object of the present invention to provide an improvement in the structure of an aluminum window, and in particular to one which enables two or more aluminum windows to be easily assembled without impairing the outside appearance thereof.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
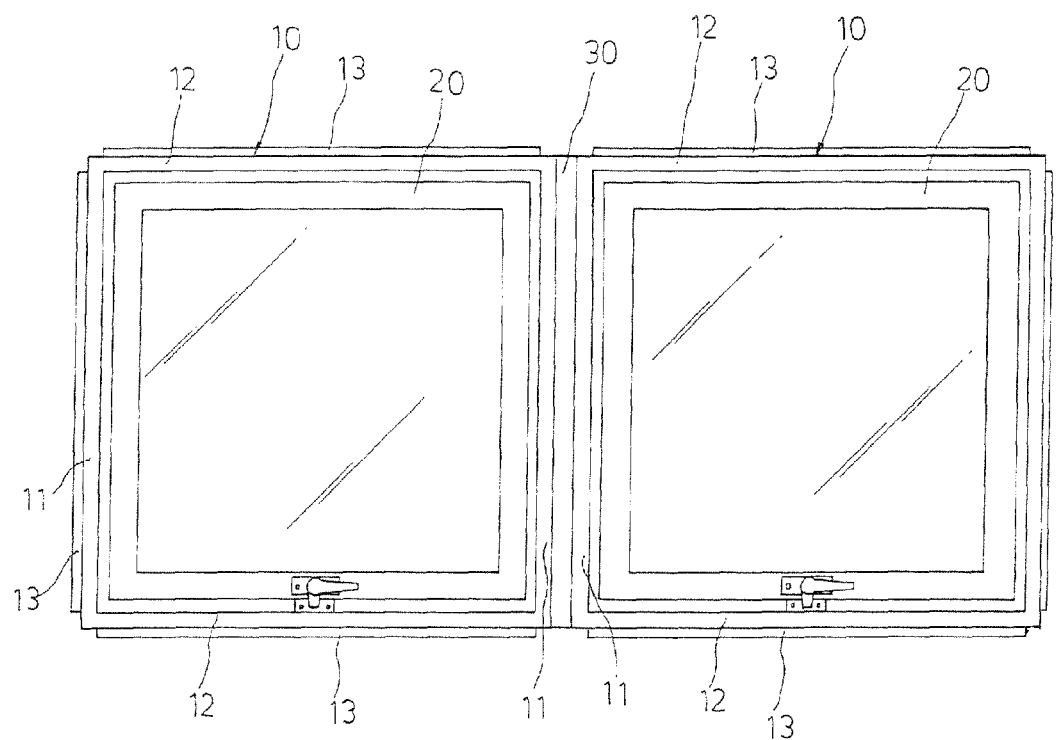
FIG. 1 illustrates two prior art window frames joined together.
Figure 2:
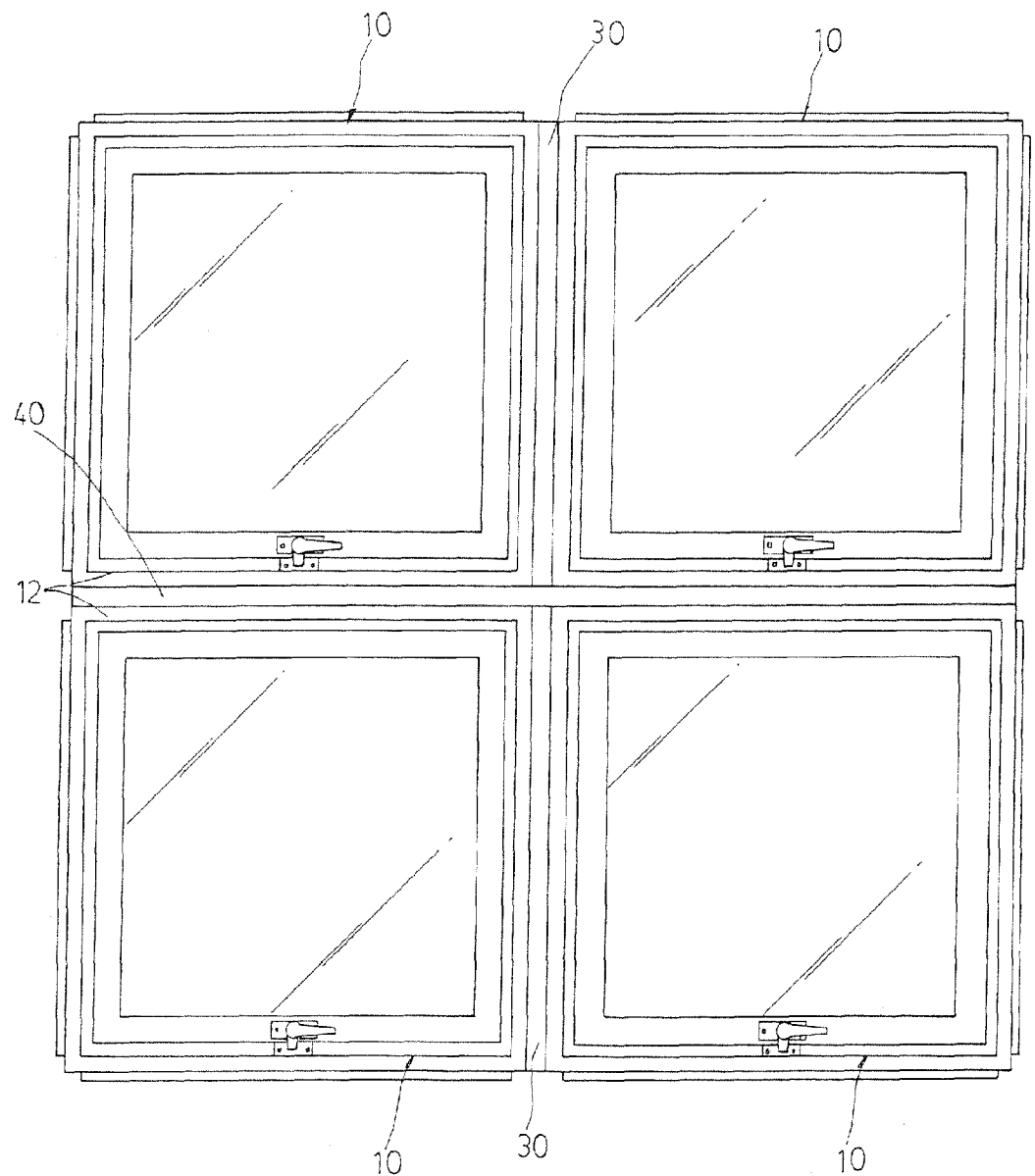
FIG. 2 illustrates four prior art window frames joined together.
Figure 3:
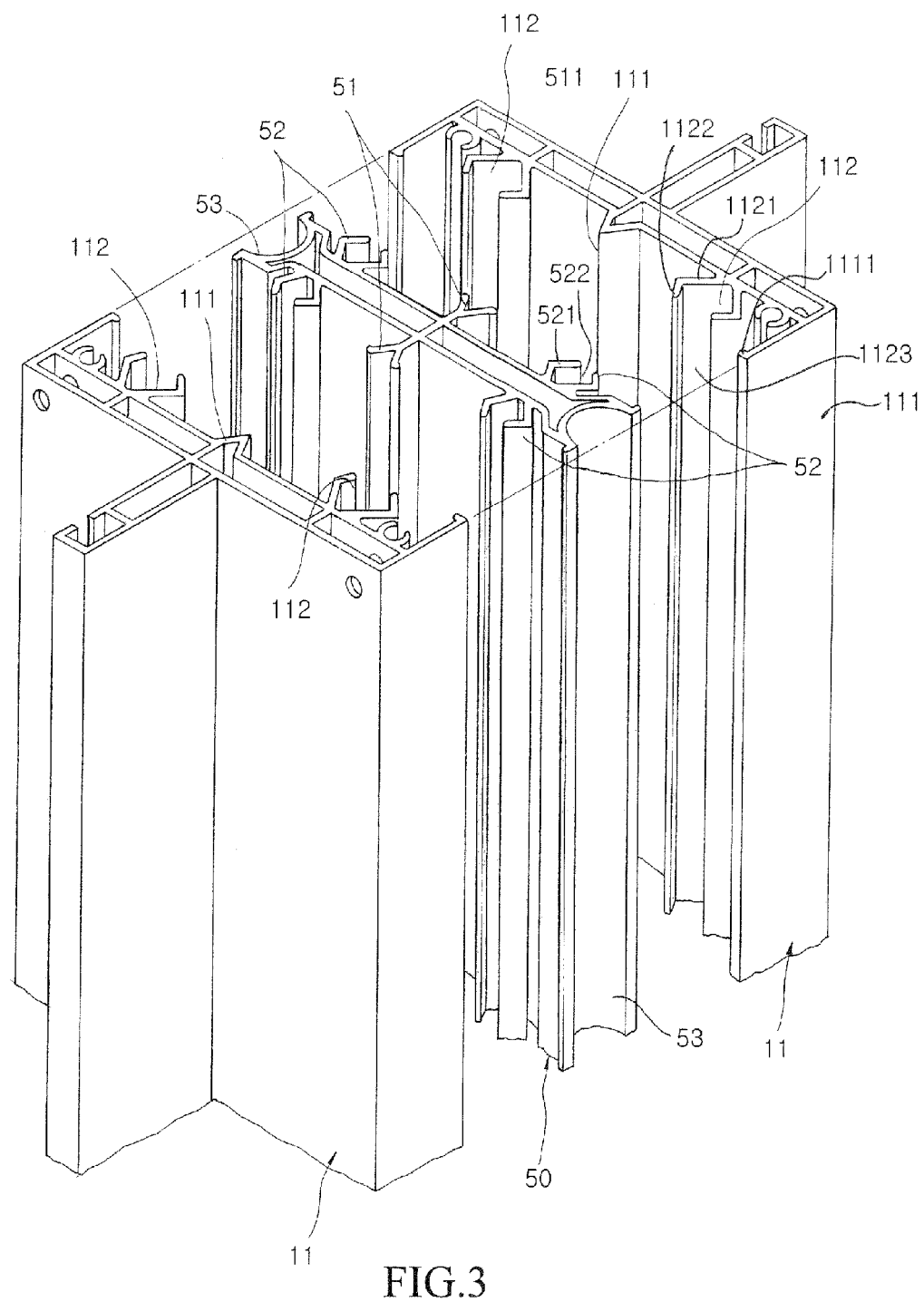
FIG. 3 is an exploded view of the present invention.
Figure 4:
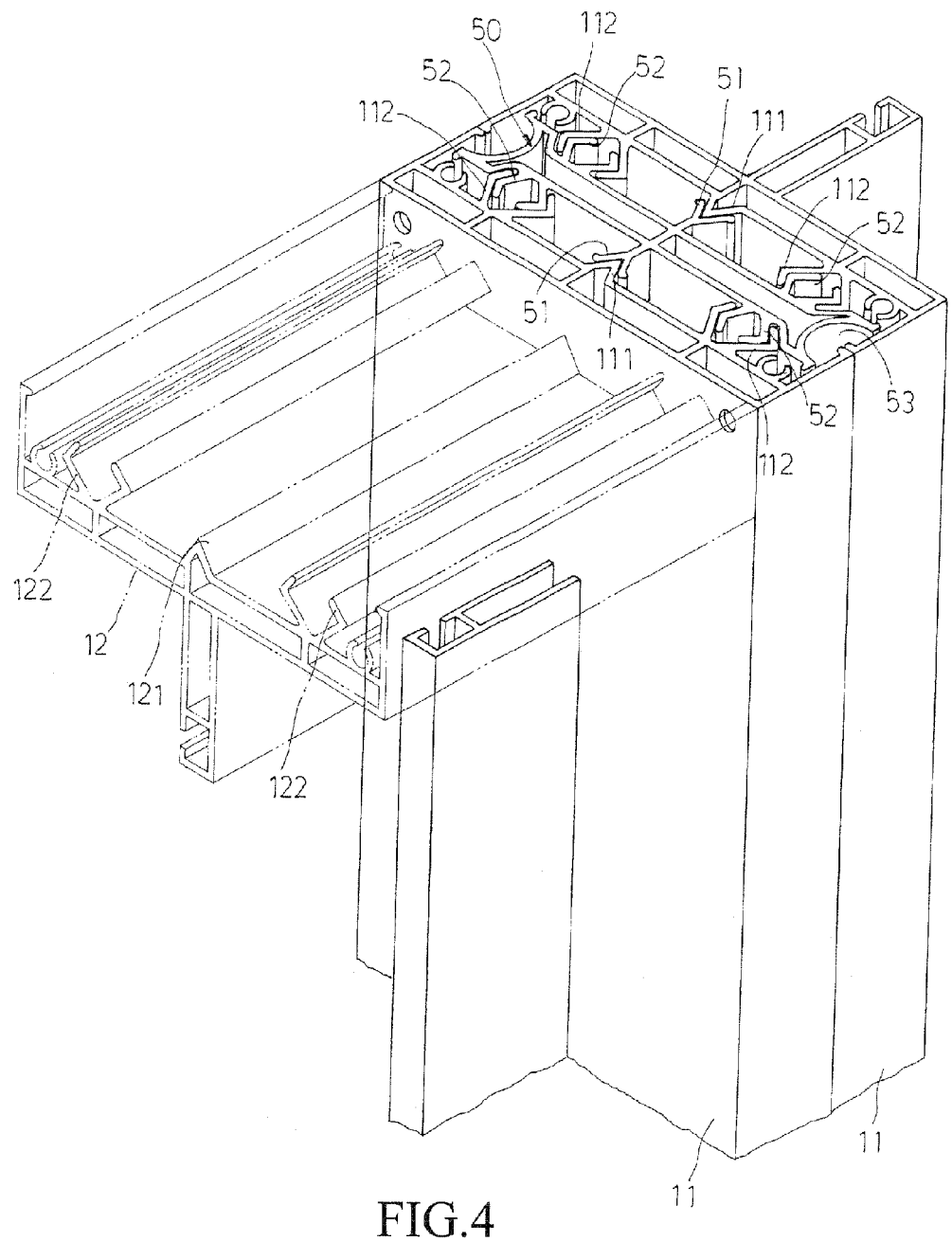
FIG. 4 illustrates the assembly of the present invention.

Referring to FIGS. 3 and 4, the joint structure for aluminum windows according to the present invention mainly comprises two vertical frames 11 and a joint plate 50. The vertical frame 1 has an inner side integrally formed with two lateral sides 1110 extending inwardly from two sides of the inner side, a V-shaped longitudinal sliding guide 111 at the intermediate portion of the inner side, and two first joint members 112 each at one side of the longitudinal sliding guide 111. The longitudinal sliding guide 111 has a triangular cross-section. The two first joint members 112 are symmetrically arranged at two sides of the longitudinal sliding guide 111. The first joint member 112 has two V-shaped arms 1121 between the top edges 1122 of which there is a longitudinal opening 1123 so that the V-shaped arms 1121 may be slightly resilient.

The joint plate 50 has two sides each provided at the intermediate portion with a longitudinal sliding rail 51 which is a Y-shaped member having a longitudinal V-shaped recess 511 at the outer side. Two second joint members 52 are each provided at one side of the longitudinal sliding rail 51. The two second joint members 52 are symmetrically arranged at two sides of the longitudinal sliding rail 51. The second joint member 52 has two V-shaped arms 521 between the top edges of which there is a longitudinal opening 522 for providing resiliency for the V-shaped arms 521. The V-shaped recess 511 of the longitudinal sliding rail 51 is configured and dimensioned to receive the V-shaped longitudinal sliding guide 111. The second joint member 52 is configured and dimensioned to be slidably fitted into the first joint member 112.

Figure 5:
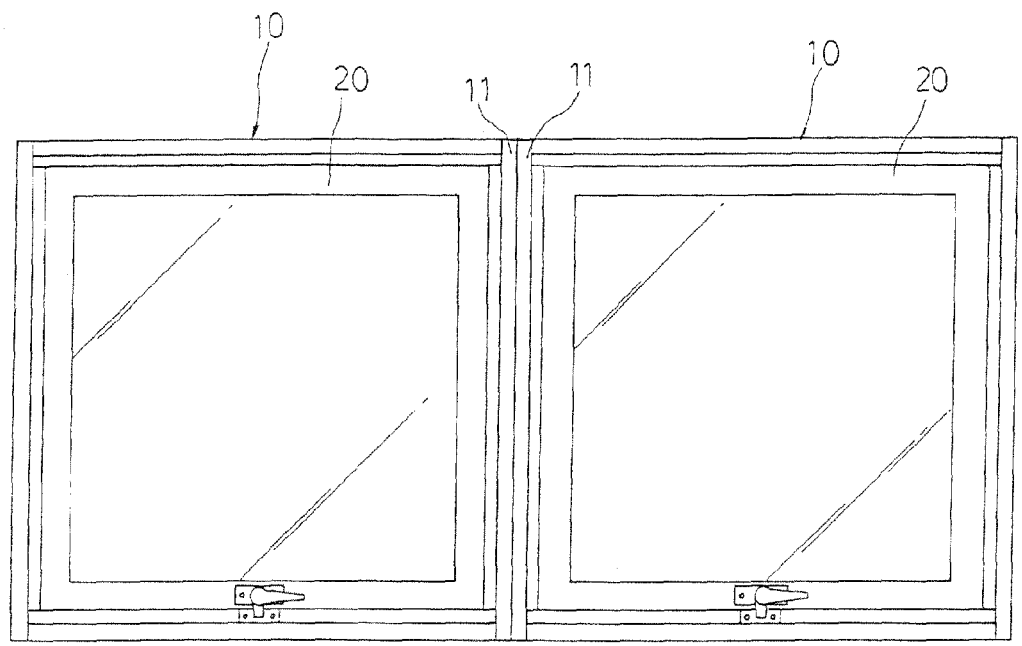
FIG. 5 illustrates the assembly of two window frames according to the present invention.

Referring to FIGS. 3, 4 and 5, the window frames 10 can be easily assembled as a whole with the joint plate 50 hidden behind the lateral sides 1110 of the two vertical frames 11.

Aside from a Y-shaped member, the longitudinal sliding rail 51 may be a member of any shape which has a recess configured and dimensioned to receive the V-shaped longitudinal sliding guide 111 of the vertical frame 11.

Referring to FIGS. 3, 4 and 5, when desired to assemble two window frames 10 together, the vertical frames 11 of the a first window frame are engaged with the joint plate 50, with the second joint members 52 of the joint plate 50 slidably fitted into the first joint members 112 of a respective one of the vertical frames 11 and with the Y-shaped longitudinal sliding rail 51 of the joint plate 50 receiving the V-shaped longitudinal sliding guide 111 of a respective one of the vertical frames 52.

Figure 6:
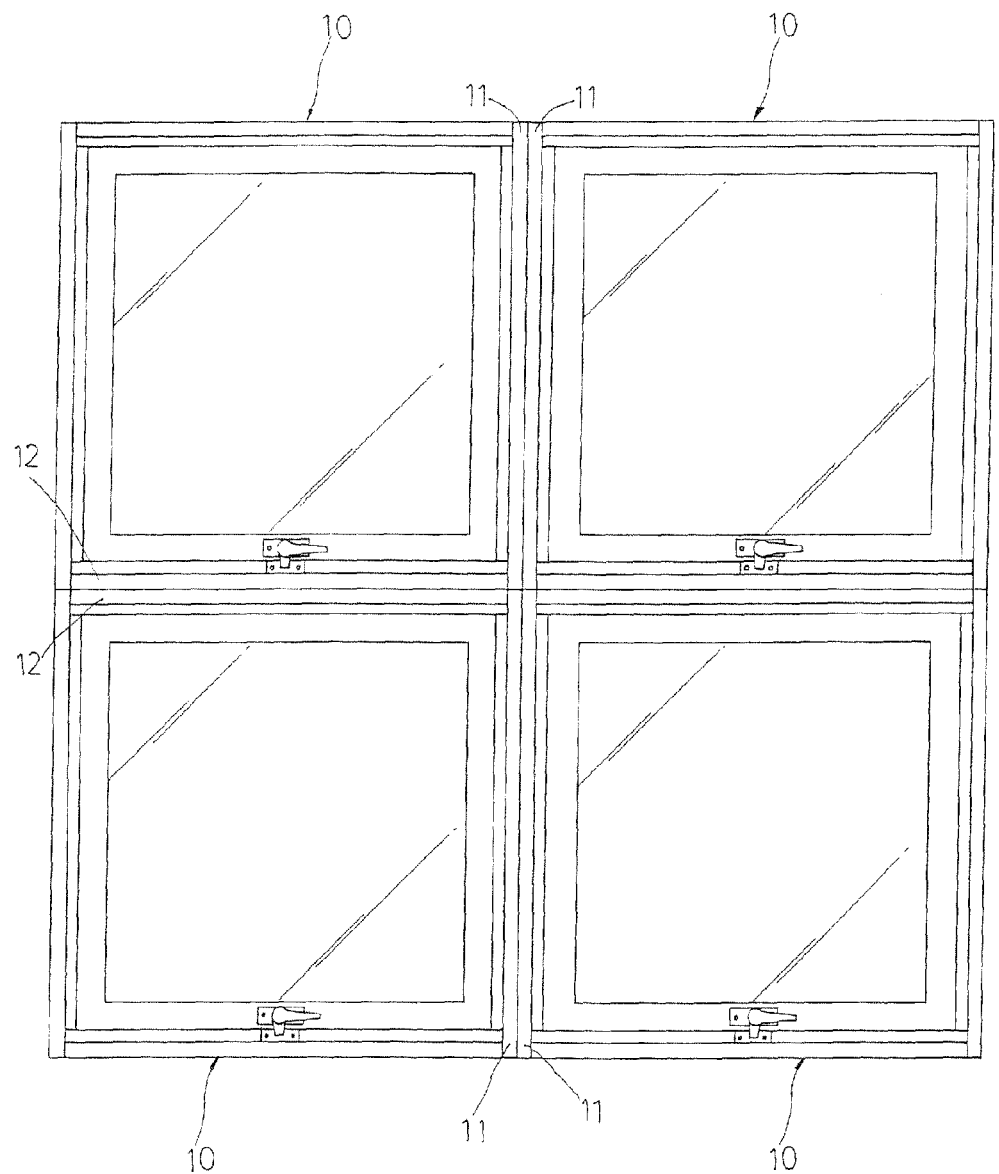
FIG. 6 illustrates the assembly of four window frames according to the present invention.

FIGS. 3, 4 and 6 illustrate the assembly of four window frames 10. As can be seen, the four window frames 10 are assembled as a whole with the joint plate 50 hidden behind the lateral sides 1110 of the two vertical frames 11.

Figure 7:
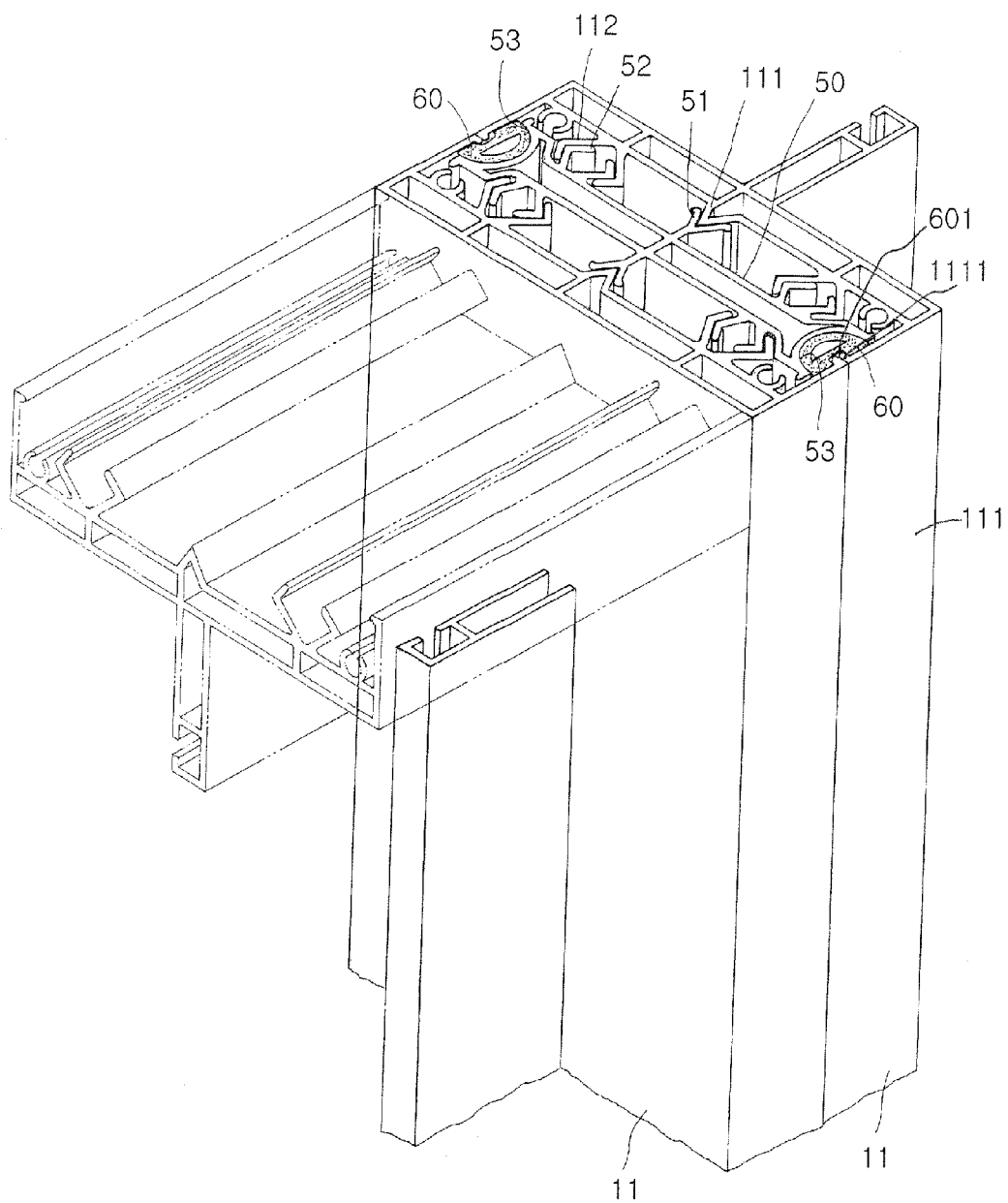
FIG. 7 illustrates a second preferred embodiment of the present invention.

Referring to FIGS. 3 and 7, the outer end of the lateral side 1110 is formed with an inwardly extending edge 1111. The joint plate 50 has two outer ends each provided with an accommodating groove 53. As the joint plate 50 is engaged with the two vertical frames 11, the accommodating groove 53 will be closed by the lateral sides 1110 of the vertical frames 11 thereby providing a space for receiving a leak proof rubber bar 60. The leak proof rubber bar 60 has a recess 601 adapted to receive the inwardly extending edges 1111 of the lateral sides 1110 of the vertical frames 11.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A joint structure for aluminum windows comprising:

a first vertical frame plate having a first inner side integrally formed with two lateral sides extending inwardly from two ends of said first inner side, a first inverted V-shaped longitudinal sliding guide on an intermediate portion of said first inner side, and two first joint members being symmetrically arranged on either side of said first inverted V-shaped longitudinal sliding guide, each of said first joint members comprising two first V-shaped arms extending from said first inner side such that a free end of each of the arms defines a longitudinal opening therebetween for providing resiliency for said first V-shaped arms;

a second vertical frame plate having a second inner side integrally formed with two lateral sides extending inwardly from two ends of said second inner side, a second inverted V-shaped longitudinal sliding guide on an intermediate portion of said second inner side, and two second joint members being symmetrically arranged on either side of said second inverted V-shaped longitudinal sliding guide, each of said second joint members having two second V-shaped arms extending from said second inner side such that a free end of each of the arms defines a longitudinal opening for providing resiliency for said second V-shaped arms; and a joint plate having two sides, each side provided with a Y-shaped longitudinal sliding rail at an intermediate portion and two third joint members each arranged on one side of said Y-shaped longitudinal sliding rail, each of said Y-shaped longitudinal sliding rails having an outer side defined by a longitudinal V-shaped recess to receive said inverted V-shaped longitudinal sliding guides of said first and second vertical frames, respectively, and each of said two third joint members being symmetrically arranged on either side of said Y-shaped longitudinal sliding rail to join with said first and second joint members, respectively.

2. The joint structure for aluminum windows as claimed in claim 1, wherein an outer end of said lateral sides of said first and second vertical frames is formed with an inwardly extending edge.

3. The joint structure for aluminum windows as claimed in claim 1, wherein said joint plate has two outer ends each provided with an accommodating groove.

4. The joint structure for aluminum windows as claimed in claim 3, further comprising a leak proof rubber fitted in said accommodating groove.

* * * * *